United States Patent Office 3,776,867
Patented Dec. 4, 1973

3,776,867
SOLVENTLESS NON-POLLUTING VEHICLES FOR HEAT-SET INKS
Harold W. Perry, Chicago, and Martin E. Swinford, Palatine, Ill., assignors to Richardson Ink Co., Niles, Ill.
No Drawing. Filed Oct. 5, 1970, Ser. No. 78,270
Int. Cl. C08g 51/72
U.S. Cl. 260—21
15 Claims

ABSTRACT OF THE DISCLOSURE

Vehicles for use in commercial heat-set inks comprising raw castor oil and hydroxylated fatty acids of castor oil which in the presence of modified resins, a cross-linking agent and an acid catalyst cure instantly when exposed to heat to form hard coatings on paper or paperlike substrates. The ink vehicles do not employ any hydrocarbon solvent additives requiring evaporation in the drying process, and therefore, no polluting vapors are present to contaminate normal atmospheric resources.

BACKGROUND OF THE INVENTION

This invention relates to a series of new and useful vehicles for commercial printing inks and more particularly to carrier compositions for heat-set inks which do not depend on conventional solvent systems for binding a resin matrix onto a substrate. The solventless vehicle and coating compositions of the instant invention are significant in that they serve as carriers for high speed, high print quality commercial inks which set instantly without special drying additives or required evaporation of hydrocarbon solvents. Thus, improved letterpress and offset solventless ink vehicles have been developed which emit virtually no contaminating waste gases or fumes.

Triglyceride oils and particularly raw castor oil and hydroxylated fatty acids of castor oil have been found to be highly desirable in ink vehicles when hardened by an agent giving a cross-linking effect with the aid of heat and an acid catalyst. Row, non-drying castor oil in solution with rosin modified resins or cellulose resins may be reacted with a cross-linking agent such as hexamethoxymethylmelamine for firm, high gloss coatings. Their use with coloring pigments provide ink compositions which eliminate the need for diluting hydrocarbon solvents, but nevertheless cure instantly with the aid of heat energy, thereby avoiding all problems resulting from contaminating gases which normally occur with conventional heat-set inks.

In addition to the absence of noxious waste emissions, the products of the present invention provide ink compositions having outstanding printability properties. Because the present varnishes cure instantly and have high lubrancy values, very high press speeds are possible. Moreover, these oil-resin varnishes provide greater stability to ink under high shear at high press speeds. They also possess excellent scuff and rub resistant properties.

The printing of magazines, newspapers and the like at high speed and with good quality has been made possible by the use of heat-set inks. This type of ink requires a vehicle composed of resins dissolved or dispersed in suitable hydrocarbon solvents. Resins ordinarily used in conventional heat-set inks are high-melting, straight thermoplastic resins or drying-oil modified resins. Those ink compositions having non-oxidizing thermoplastic resins are generally of more limited use because they frequently lack proper rub and scuff resistance. On the other hand, solvent containing modified resins having drying-oils such as tung, linseed, soybean, and perilla, including dried castor oil, althonugh more versatile, contain in most cases additional metallic driers consisting of fatty acid salts of lead, cobalt and manganese which can adversely affect press speeds under certain conditions.

Notwithstanding the wide acceptance of drying-oil resin varnishes by the printing industry, the presence of hydrocarbon solvents in such ink vehicles has created problems rendering them less than satisfactory for present day large commercial printing operations. As previously indicated, conventional vehicles used in heat-set inks, and more specifically, drying-oil resin vehicles are dissolved in solvents which are ordinarily narrow-cut petroleum fractions with boiling ranges of from 450° to 600° F. One principal function of this solvent system is to bind the resin to the printed substrate. This process naturally requires removal of the solvent from the printed substrate which is achieved by evaporation.

In actual press runs using conventional solvent containing heat-set inks, the printed substrate is passed between electric or gas fired units, through ovens or over heated cylinders to raise the temperature of the substrate enough to cause evaporation of the solvent. It is not unusual for temperatures to range as high as 700° F. Frequently, combinations of heating means and high velocity air blasts are used to simultaneously drive off solvents from the substrate and to stir the volatile vapors for subsequent discharge.

It is through the above process of evaporation and discharge of the vapors in high speed commercial presses that heat-set inks have become a major contributor of air pollution in large urban centers. Solvent evaporating of heat-set inks has been a source of continuous air contamination caused by noxious fumes consisting essentially of incompletely oxidized gases having a high concentration of solids.

Previous attempts by the graphic art industry to cope with pollutants from the evaporation of ink solvents have been principally in the area of equipment modification, e.g. improved drying devices, blowers, ventilators, and the like. The equipment modification approach has proven to be very costly and the results less than adequate particularly in view of Federal and State legislative regulations placing greater limitations on industrial emissions.

Another disadvantage of ordinary drying-oil varnishes has been their incompatibility with metallic driers used in such vehicles as drying catalysts to advance the rate of gelation. The above-mentioned soap driers are quite sensitive to acid residues which frequently remain in ink pigments. Upon incorporation into drying-oil resin vehicles, acid residues in the pigment react with the soap drier causing decomposition of the drier. The result is a loss of drying properties, slower and less satisfactory press runs.

Accordingly, it is a principal object of this invention to provide a solventless ink vehicle which cures instantly by the application of heat energy.

Another principal object is to provide heat-set ink vehicles which do not emit contaminating fumes upon curing.

It is another object of the present invention to provide industry which assure high press speeds with high print quality.

solventless coatings and printing inks for the graphic arts.

It is a further object to provide solventless oil-resin carriers to make highly stable commercial ink compositions without the necessity of drying additives.

A still further object is to provide a method of printing by applying to substrates, ink compositions having a solventless vehicle, and curing the printed substrate without the emission of any contaminating gases.

Other objects, features and advantages of this invention will become apparent to those skilled in the art after a reading of the following more detailed description.

SUMMARY OF THE INVENTION

As previously indicated, the compositions of the present invention do not anticipate the use of conventional drying oils. Such oils are principally glycerides of linoleic and linolenic acids which upon drying form hard, resinous masses that are unsuitable in solventless varnish compositions. However, tung oil, generally considered a drying oil, has been used with moderate success and may be employed in vehicles of the type shown herein.

The preferred oils for use in the instant solventless carriers are triglyceride esters of fatty acids which are predominantly ricinoleic acid. However, any long chain fatty acid having a hydroxyl group in the chain would be suitable. A principal example of such oil is raw castor oil which has not been dried and possesses, in addition to an ester linkage, a point of unsaturation and a hydroxyl group. In contradistinction, dehydrated or distilled castor oil without a hydroxyl function is a true drying oil and could not be used in the present vehicles.

It should be noted that although castor oil has been widely used as a plasticizer and solvent, it is not its function in the vehicles of the present invention. Essentially, it has been discovered that when an agent capable of providing a cross-linking effect is added to the oil, it promptly sets by cross-linking through its hydroxyl group to form a hard coating provided heat is applied in the presence of an acid catalyst. This cross-linking system also contemplates the use of mono-basic acids derived from castor oil, such as ricinoleic acid, oleic acid, erucic acid, linoleic acid, or tall oil acids, which may be advantageously added to the triglyceride oil in an amount ranging from about 5 to 20% by weight and preferably about 10% by weight based upon the total weight of the varnish composition. The raw triglyceride oils are effectively used in the range of from 40% to 80% by weight and preferably at about 65% by weight based upon the total weight of the vehicle.

The raw, hydroxylated triglyceride oil is heated in a single vessel with a resin to make a physically homogeneous solution which does not separate on cooling. The resin-oil mixture should be heated to a temperature of about 385° to 410° F. to fuse the oil and resin together. Here, the resin and oil do not react or copolymerize. A reaction between the two would result in a less desirable, lower gloss product. The mixture should be slowly heated until all the resin has dissolved in the oil rendering a clear, transparent solution. Use of a resin is preferred since it provides added hardness, luster and adhesion properties to ink compositions.

In selecting the resin for use with the oil, a basic requirement then is that the resin be soluble and compatible with the oil. Most favorable properties are obtained when a gloss promoting amount of resin is heated with the oil, and more particularly, if used in an amount from 8% to 50% by weight based upon the total weight of the final varnish vehicle. Optimumly, the gloss promoting resin should be present in an amount of about 16% by weight.

Those resins found most acceptable for use in the present vehicles are various cellulose resins and rosin modified resins. Modified resins include modified resin esters such as maleic alkyd modified rosin esters, rosin modified maleic, fumaric and phenolic resins having an acid number of from 25 to 300.

Rosin modified resins are well-known and available products of commerce. Maleic type resins can be prepared by Diels-Alder mechanism whereby rosin and maleic anhydride are refluxed at a temperature of about 150° C. to form a levopimaric acid maleic anhydride adduct having a melting point range from 85 to 140° C. and an acid number of at least 25. U.S. Pat. 2,638,226 is but one example demonstrating the characteristic reaction of rosin and maleic anhydride. Maleic resins of this type are specially desirable because of their resistance to heat and yellowing. Some examples of modified maleic resins found useful in the solventless varnishes of the present invention are those marketed under the trademark "Amberol" and particularly the "800" series by Rohm and Haas.

Modified fumaric acid resins are prepared in much the same manner as the maleics whereby rosin undergoes a normal Diels-Alder type condensation reaction, but in this case, fumaric acid is used rather than maleic anhydride. The reaction is allowed to proceed at 220° C. The reaction involving the preparation of rosin modified fumaric resins has been described in the Journal of American Chemical Society, vol. 80, 368 (1958). One example of rosin modified fumaric resin is the product available under the trademark "Krumbhaar Resin K-1515."

Glycerol and pentaerythritol esters of the above maleic and fumaric resins have also proven quite useful in the present vehicles. In their preparation, rosin and glycerol can be heated to 175° C. and when in a molten state, maleic anhydride added and heated to 240° C. for 1 hour. The temperature is then raised to 270° C. and held until the acid number is at least 25. Glycerin maleic modified rosin esters are available under the trademark "Lewisol" and "Acintol R." Pentaerythritol maleic rosin esters can be purchased under the trademark "Pentalyn" by Hercules.

Rosin modified phenolics are also useful adjuvants in varnish coatings as shown herein providing good hardness and excellent gloss properties to printing ink. Processes for preparing phenolic modified resin esters are also well known. One method may consist of adding phenol formaldehyde condensate to molten rosin at relatively low temperature, heating the mixture to 250° C. until a solution is obtained and foaming subsides, finally esterifying the melt with glycerin or pentaerythritol. Such resins are also available under the trademark "Amberol."

Other rosin modified resins for use in solventless ink vehicles are the maleic modified alkyd resins. Such products have been prepared by the reaction of a rosin ester and the product obtained by reacting a dihydric alcohol such as ethylene glycol with a dibasic acid such as maleic acid. Alkyd type resins are available under the trademark "Neolyn" and are fully described in U.S. Pat. 2,411,904.

Cellulose resins also have been found to impart favorable properties to the solventless vehicles disclosed herein. More specifically, esters and mixed esters of cellulose if used in the same manner as the modified rosin esters shown above, provide comparable results. Cellulose acetate butyrate and cellulose acetate propionate give particularly good results when used in the instant ink compositions.

As indicated in the foregoing description, the addition of resins to the oil is preferred since they provide more of those properties considered desirable in ink compositions, namely, hardness, gloss and body. However, their use in the disclosed solventless vehicles may be omitted entirely under special circumstances. For example, an ink to perform properly and especially under high press speeds, must be able to feed correctly from the press ink fountain to transfer properly from roller to roller in the inking system and to the plate, blanket and the surface being printed. Frequently, commercial inks including heat-set inks containing varnish resins, do not have proper body and tack to perform well. Accordingly, it has been discovered that the solventless vehicles of the instant invention in the absence of any of the above resin materials are specially useful as reducers to correct rheology in ink compositions lacking proper viscosity and other working properties.

In preparing the ink reducers, hydroxylated triglyceride oil is heated to about 230° to 250° F. in the presence of an agent capable of causing a cross-linking effect. Hexamethoxymethylmelamine is the preferred agent because of its high stability when cross-linked, and can be heated to relatively high temperatures without decomposition. But above all, it is essential that the oil or oil-resin mixtures do not undergo cross-linking until heated to a temperature of about 350° F. At that temperature, the solventless vehicles will cure instantly by the thermal catalytic polymerization to form a hard, high gloss matrix on various substrates.

It should be noted, however, that in preparing either solventless reducing vehicles or solventless vehicles for heat-set inks containing rosin modified resins, the oil temperature should not exceed 250° F. Temperatures above 250° F. are apt to cause the cross-linking agent to react with the oil prematurely, thereby causing the mixture to harden. Thus, where an oil and resin mixture is used in preparing solventless ink vehicles, the temperature should be lowered accordingly before incorporating the cross-linking agent. The amount of cross-linking agent used is generally about 8% to 50% by weight and preferably 16% by weight based on the total weight of the vehicle.

In addition to hexamethoxymethylmelamine, it has also been discovered that certain amino resins are quite reactive with hydroxylated oils and are capable of cross-linking therewith. Resins such as urea and melamine formaldehyde which includes other triazine formaldehyde resins prepared from such compounds as benzoguanamine, will cross-link with castor oil provided the proper acid catalyst is used in the presence of heat. It should be noted, however, that although thermosetting aminoplasts perform satisfactorily, their rate of curing is rather slow, and therefore, diminished press speeds should be expected.

The above aminoplasts are known products and are well documented in the literature. They can be prepared by the poly-condensation of formaldehyde with a nitrogen compound and a higher aliphatic alcohol. Suitable commercially available aminoplasts are those sold under the trademarks "Uformite" by Rohm and Haas and "Resimene" by Monsanto.

The basic solventless vehicles comprising raw hydroxylated triglyceride oil, rosin modified resin and suitable cross-linking agent should have a viscosity in the range of 6.27 to 63.4 poises at 25° C.; however, the preferable working range is from 17.6 to 30 poises.

Coloring pigments may then be flushed into the carrier. The solventless vehicles are entirely compatible with both inorganic and organic color pigments and dyes. If, however, greater scuff and slip resistance is desired, wax materials may be added beforehand. Usually about 2% by weight of a dispersion of polyethylenes, hydrocarbon, vegetable or animal wax materials can be added to the oil-resin vehicle while hot.

An acid catalyst is then incorporated into the mixture which promotes curing of the oil when heat energy is applied thereto. Organic acids, when used in an amount from about 2% to 6% by weight and preferably 3% by weight assure instantaneous binding and hardening of the vehicle to the substrate.

Specific organic acids which have been found suitable according to the present invention are trifluoroacetic acid, maleic acid, methane sulfonic acid, monobutyl orthophosphate acid, butyl phosphoric acid, paratoluene sulfonic acid and butyl maleate acid. Sulfonic acids such as paratoluene sulfonic acid provide particularly good results with the instant carriers.

Another embodiment of the catalyst system of the solventless vehicles of the present invention has been the use of a stabilizer with the catalyst. To assure a prolonged shelf life for commercial ink compositions of the type disclosed, it is advantageous to employ the catalyst in a vehicle comprising about 60% by volume of glycerol allyl ether. The ether acts to inhibit too rapid, premature hardening or autocuring of the varnish carrier while in storage.

As mentioned above, the instant vehicles are free of any hydrocarbon solvents, but nevertheless possess all the properties necessary for good printability and print quality without expensive alteration of existing press equipment. The solventless vehicles once dispersed or flushed with the desired pigments are particularly suitable for use in letterpress heat-set web and offset heat-set web printing presses and sheet fed presses. Superior press speeds can be achieved on extended runs on paper-like substrates which includes newsprint, calendered papers such as cardboard, and the like.

The following examples illustrate some of the embodiments of this invention. It is to be understood that these are for illustrative purposes only and do not purport to be wholly definitive as to conditions and scope.

EXAMPLE I

A basic solventless varnish was prepared having the following formulation:

|   | Percent |
|---|---|
| Castor oil, Grade 3 technical | 65.50 |
| Lewisol Resin-28 (Hercules), acid No. 28, specific gravity 1.138, viscosity, Gardner-Holdt 25° C.—E | 16.25 |
| FT-300 wax—Fisher-Storch process synthetic paraffin wax | 2.00 |
| Hexamethoxymethylmelamine | 16.25 |
|   | 100.00 |

A varnish kettle was charged with a mixture of the castor oil and modified alkyd resin and slowly heated to 400° F. The heating was continued until a clear, homogeneous mixture was obtained and then allowed to cool to about 250° F. The hexamethoxymethylmelamine was incorporated into the oil-resin mixture and agitated to aid in its dissolution. Before cooling, the wax was incorporated into the mixture and cooled to room temperature. The final product had a viscosity of 17.6 poises at 25° C.

EXAMPLE II

A heavy varnish formulation was prepared with the following composition:

|   | Percent |
|---|---|
| Castor oil, Grade 3 | 55.00 |
| Lewisol Resin-28 | 23.25 |
| FT-300 wax | 2.00 |
| Hexamethoxymethylmelamine | 19.75 |
|   | 100.00 |

This vehicle was prepared by the same method disclosed in Example I. The viscosity was 36.2 poises at 25° C.

EXAMPLE III

A solventless-ink composition was prepared using the basic carrier system.

|   | Percent |
|---|---|
| Solventless varnish of Example I | 78.00 |
| Blue pigment (Melori Blue) | 22.00 |
|   | 100.00 |

The solventless varnish was weighed into a Pony mixer and then the pigment was added and mixed until thoroughly incorporated. The final dispersion of the pigment was completed on a standard three-roll ink mill.

EXAMPLE IV

A catalyst composition prepared separately for incorporation into oil-resin mixtures had the following formulation:

| | Percent |
|---|---|
| Paratoluene sulfonic acid (80% paratoluene and 20% ortho toluene sulfonic acid) | 40.00 |
| Glycerol-allyl ether (Shell) | 60.00 |
| | 100.00 |

EXAMPLE V

A solventless heat-set ink composition was prepared with the following:

| | Percent |
|---|---|
| Basic varnish (Example I) | 80.50 |
| Black pigment (Regal Black—Cabot) | 11.25 |
| Formulation of Example III | 5.50 |
| Catalyst composition of Example IV | 2.75 |
| | 100.00 |

The basic varnish, black pigment and formulation of Example III were blended on a three-roller mill and the catalyst was incorporated as the last step. This process black solventless heat-set ink was used in an extended run on a heat-set web offset press. Press speeds of 930 feet per minute were attained.

EXAMPLE VI

Solventless-process red

| | Percent |
|---|---|
| Basic varnish (Example I) | 83.5 |
| Rhodamine Red (Uhlich) | 13.5 |
| Catalyst system (Example IV) | 3.0 |
| | 100.0 |

Solventless-process yellow

| | Percent |
|---|---|
| Basic varnish (Example I) | 43.75 |
| Heavy varnish (Example II) | 43.75 |
| Benzidene Yellow (Hercules) | 4.85 |
| Benzidene Yellow (Industrial Color) | 4.85 |
| Catalyst system (Example IV) | 2.80 |
| | 100.00 |

Solventless-process blue

| | Percent |
|---|---|
| Basic varnish (Example I) | 89.50 |
| Phthalo Blue (Du Pont) | 6.75 |
| Phthalo Green (Du Pont) | 0.75 |
| Catalyst system (Example IV) | 3.00 |
| | 100.00 |

EXAMPLE VII

A solventless reducing varnish was prepared with the following formulation:

| | Percent |
|---|---|
| Castor oil (Grade 3) | 78.00 |
| Hexamethoxymethylmelamine | 22.00 |
| | 100.00 |

A varnish kettle was charged with a mixture of the castor oil and hexamethoxymethylmelamine and slowly heated to 240° F. until a clear solution is obtained and then allowed to cool to room temperature.

While the invention has been described in conjunction with specific examples thereof, they are illustrative only. Accordingly, many alternatives, modifications and variations will be apparent to those skilled in the art in light of the foregoing description, and it is therefore intended to embrace all such alternatives, modifications and variations as to fall within the spirit and broad scope of the appended claims.

We claim:

1. A solventless vehicle for use in heat-set inks comprising: a hydroxyl-containing material selected from the group consisting of hydroxyl-containing triglyceride oil and long chain fatty acid having a hydroxy group; an amino cross-linking agent capable of reacting with said material at a temperature above 250° F. to cross-link said material through the hydroxy groups thereon; an organic acid catalyst which when present in said vehicle promotes said cross-linking upon the application of heat to set the vehicle without substantial vapor evolution; and, a rosin modified resin having an acid number of from 25 to 300 which is soluble and compatible with the hydroxy containing material, and which does not react or copolymerize when mixed with the hydroxy containing material so as to reduce the gloss of the heat-set ink.

2. The solventless vehicle of claim 1 wherein the rosin modified resin is a member selected from the group consisting of maleic-alkyd modified rosin ester, rosin modified maleic resin, rosin modified fumaric resin and rosin modified phenolic resin.

3. The solventless vehicle of claim 1, which comprises raw castor oil, maleic alkyd modified rosin ester, hexamethylmelamine and paratoluene sulfonic acid.

4. The solventless vehicle of claim 1 in which the cross-linking agent is selected from the group consisting of hexamethoxymethylmelamine, urea melamine formaldehyde resins, and triazine formaldehyde resins.

5. The solventless vehicle of claim 1 wherein said hydroxyl-containing material is present in the form of a hydroxyl-containing triglyceride oil in an amount of from about 40% to 80% by weight, said cross-linking agent is present in an amount of from about 8% to 50% by weight, said catalyst is present in an amount of from about 2% to 6% by weight, and said resin is present in an amount of from about 8% to 50% by weight, all said amounts being based on the total weight of said vehicle.

6. The solventless vehicle of claim 1 wherein said hydroxyl-containing material is present in the form of a hydroxyl-containing triglyceride oil in an amount of approximately 65% by weight, said cross-linking agent is present in an amount of approximately 16% by weight, said catalyst is present in an amount of approximately 3% by weight, and said resin is present in an amount of approximately 16% by weight, said amounts being based on the total weight of the vehicle.

7. The solventless vehicle of claim 1 in which said acid catalyst is selected from the group consisting of organic sulfonic acids, trifluoroacetic acid, maleic acid, monobutyl orthophosphate acid, butyl phosphoric acid and butyl maleate acid.

8. The solventless vehicle of claim 1 in which said hydroxy-containing material is present in the form of a hydroxyl-containing triglyceride oil.

9. The solventless vehicle of claim 1 in which said resin is a glycerin maleic modified rosin ester.

10. The solventless vehicle of claim 1 in which said resin is a pentaerythritol maleic rosin ester.

11. The solventless vehicle of claim 1 wherein the hydroxyl-containing material is present in the form of hydroxyl-containing castor oil.

12. The solventless vehicle of claim 1 including a fatty acid of hydroxyl-containing castor oil.

13. The solventless vehicle of claim 1 wherein said hydroxyl-containing material is a fatty acid selected from the group consisting of ricinoleic acid, oleic acid, erucic acid, linoleic acid, and tall oil.

14. The solventless vehicle of claim 1 wherein the cross-linking agent is hexamethoxymethylmelamine.

15. The solventless vehicle of claim 1 which includes a pigment.

(References on following page)

References Cited

UNITED STATES PATENTS

| | | | |
|---|---|---|---|
| 3,660,329 | 5/1972 | Wysocki | 260—21 |
| 3,257,344 | 6/1966 | Carlick | 260—21 |
| 3,412,053 | 11/1968 | Pugliese | 106—30 |
| 2,547,497 | 4/1951 | Rowland | 260—101 |
| 2,063,541 | 12/1936 | Ellis | 260—101 |
| 2,306,281 | 12/1942 | Rust | 260—101 |
| 2,547,493 | 4/1951 | Rowland | 260—101 |

OTHER REFERENCES

Castorwax and Other Hydroxy Waxes, 1966, Technical Bulletin No. 88, pp. 8, 9 and 28.

"Printing Ink Technology," Apps, 1958, pp. 385–390.

DONALD E. CZAJA, Primary Examiner

W. E. PARKER, Assistant Examiner

U.S. Cl. X.R.

106—28, 29, 30; 260—15, 24, 26

UNITED STATES PATENT OFFICE
CERTIFICATE OF CORRECTION

Patent No. 3,776,867      Dated December 4, 1973

Inventor(s) Harold W. Perry and Martin E. Swinford

It is certified that error appears in the above-identified patent and that said Letters Patent are hereby corrected as shown below:

Column 3, lines 1 to 3 should read as follows:

"solventless coatings and printing inks for the graphic arts industry which assure high press speeds with high print quality."

Column 3, line 36 should be "Essentially," not Essentially.

Signed and sealed this 3rd day of December 1974.

(SEAL)
Attest:

McCOY M. GIBSON JR.
Attesting Officer

C. MARSHALL DANN
Commissioner of Patents